United States Patent [19]

Pennisi et al.

[11] Patent Number: 5,639,416
[45] Date of Patent: Jun. 17, 1997

[54] METHOD OF MOLDING PRECISION PARTS

[75] Inventors: Robert W. Pennisi, Boca Raton; Gregory D. Jackson, Plantation; Glenn F. Urbish, Coral Springs, all of Fla.; Louis D. Megleo, Zyon, Ill.

[73] Assignee: Motorola, Inc., Schaumburg, Ill.

[21] Appl. No.: 342,450

[22] Filed: Nov. 18, 1994

(Under 37 CFR 1.47)

[51] Int. Cl.⁶ .................. B29C 45/37; B29C 45/44
[52] U.S. Cl. .............. 264/571; 264/102; 264/313; 264/318; 264/328.6; 249/139; 425/440; 425/DIG. 44
[58] Field of Search .................. 264/571, 102, 264/313, 318, 328.6; 249/61, 139; 425/DIG. 44, 440

[56] References Cited

U.S. PATENT DOCUMENTS

| | | | |
|---|---|---|---|
| 3,776,683 | 12/1973 | Putzer et al. | 425/440 |
| 3,883,627 | 5/1975 | Fitts | 264/51 |
| 3,989,790 | 11/1976 | Bruner et al. | 264/225 |
| 4,045,153 | 8/1977 | Maurino et al. | 425/440 |
| 4,412,804 | 11/1983 | Huther | 425/546 |
| 5,151,232 | 9/1992 | Thornthwaite et al. | 264/130 |
| 5,433,418 | 7/1995 | Nowak et al. | 249/139 |

Primary Examiner—Jill L. Heitbrink
Attorney, Agent, or Firm—Dale W. Dorinski

[57] ABSTRACT

A process for molding dimensionally accurate plastic articles using a low pressure injection molding technique. The process utilizes a two-piece silicone rubber mold having a cavity representative of the shape of the article to be molded. The mold is substantially encased on all sides in a rigid mold box to prevent deformation of the cavity during the molding process (10). The mold box and the encased mold are placed in a vacuum chamber, and a vacuum is drawn on the chamber to evacuate the cavity (20). A predetermined amount of a reactive mixture is simultaneously mixed and injected under pressure into the mold to form the plastic article (30). The amount of material injected is sufficient to fill the cavity but not sufficient to distort the cavity. The chamber is vented (40) and the mold is removed from the mold box (50). The mold is flexed in order to remove the plastic article from the mold (60).

11 Claims, 1 Drawing Sheet

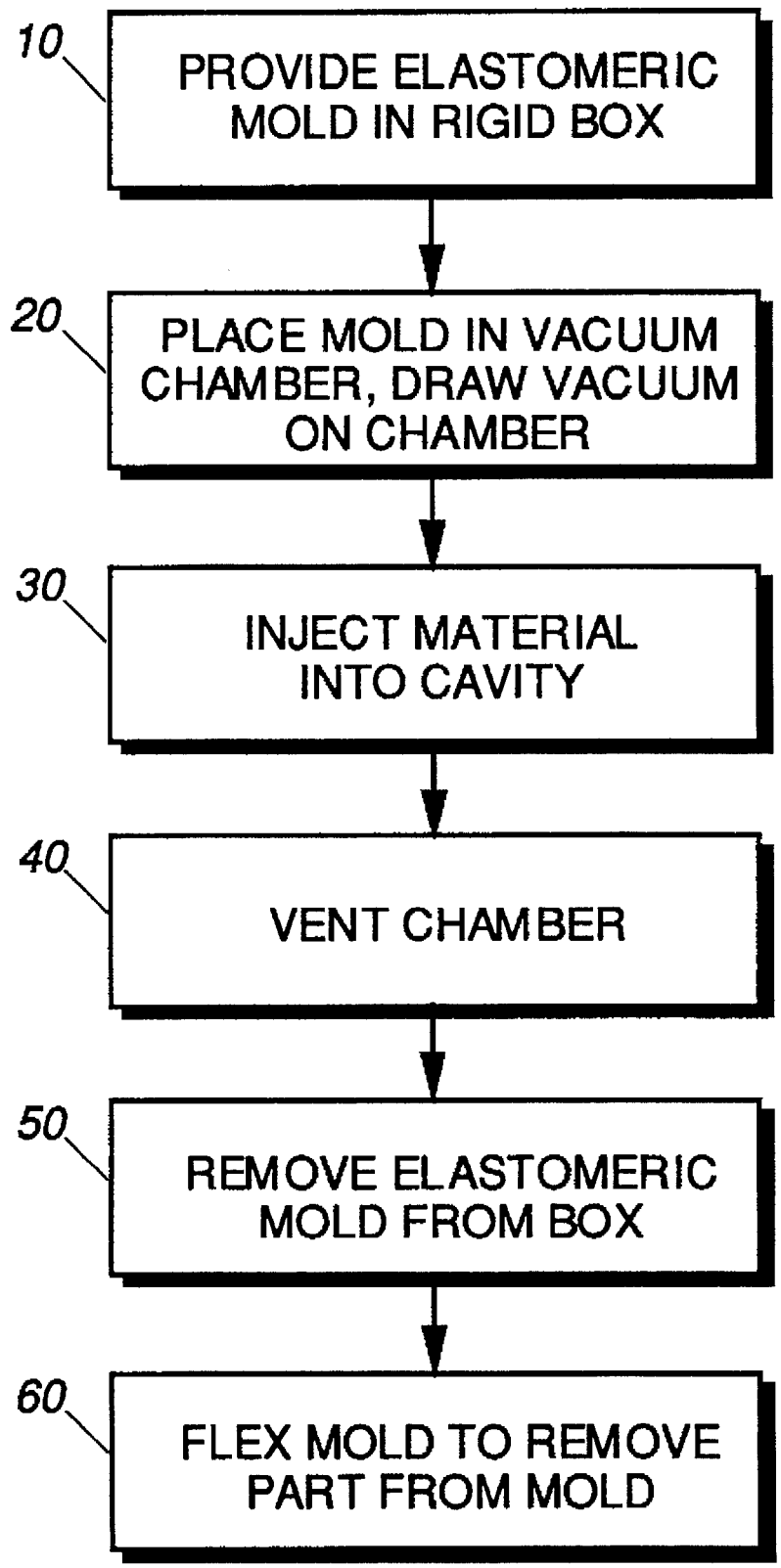

METHOD OF MOLDING PRECISION PARTS

CROSS REFERENCE TO RELATED APPLICATIONS

This application is related to U.S. application Ser. No. 08/342,409 by Jackson, et al., filed concurrently herewith, entitled "Flexible Tool for Reaction Injection Molding of Precision Parts."

TECHNICAL FIELD

This invention relates in general to a method of molding, and in particular, to a low pressure injection molding technique.

BACKGROUND

Product designers continually seek ways of reducing the time and cost of the product development cycle. Prototyping is often used during product development in order to verify design concepts and facilitate mechanical testing. A prototype must have characteristics sufficiently close to the desired product to permit a realistic prediction of actual product performance. Products that have injection-molded plastic components can be expensive to prototype and require a long lead time. These injection-molded plastic parts require a metal mold in order to create prototypes that are dimensionally accurate. The metal mold is expensive to produce and requires a long lead time, thereby necessitating a significant allocation of time to designing the mold, machining the mold cavity, texturing the surface of the mold, and so forth. Typically, several design iterations are required for each new product, further increasing the high cost and long lead time. Thus, it is clear that metal mold techniques are not well suited for rapid prototyping applications.

One alternative to the metal mold has been low-cost silicone rubber molds. A typical method of preparing this mold involves creating a model of the article or part to be molded. Pourable silicone rubber is employed to form a three-dimensional mold of the article to be copied. These liquid silicones are generally poured over a portion of the article and then cured to form one-half of the mold. The process is then repeated with the other half of the article, creating the second half of the mold. The two mold halves are then mated together and the empty cavity representative of the article is filled by pouring a material, such as epoxy, into the mold. After the epoxy has cured, the two mold halves are separated and the molded article is removed. The use of a flexible rubber for the mold allows production of articles having considerable backdraft portions, and also reduces the cost and the cycle time required to create prototypes.

However, fundamental problems remain. For example, the number of materials useful for casting the molded article is limited to those which are easily pourable at or near room temperature. Further, the casting technique is limited with regard to the quality of the finished part that can be created—air voids and other dimensional inaccuracies are inherent to the gravity-poured casting technique. Another fundamental problem is distortion of the flexible mold by the poured material, either as a result of the forces applied from the sheer mass of the epoxy, or due to expansion or contraction of the material during the curing cycle. Although the distortion of the mold may be relatively slight, it becomes significant with high-precision or thin-walled parts, and is unacceptable. Further, pourable materials such as epoxy require a long cure time, severely limiting the number of parts that can be produced in a day. The long cycle time for molding each part makes the production of a reasonable number of parts difficult and expensive. Furthermore, filling of the mold with the resin when using the gravity casting technique is awkward and difficult.

Clearly, a low-cost method for rapid prototyping low to moderate volume production of precision plastic articles is needed. Current techniques for prototyping molded parts are costly and inadequate for most applications. A molding technique that permits the utilization of a wider number of plastic materials more suitable to that used in the end product would be desirable. Hence, there is a need for a more expeditious and cost-effective way of producing dimensionally accurate, precision-molded parts.

BRIEF DESCRIPTION OF THE DRAWINGS

FIG. 1 is a flow chart showing the process steps in accordance with the invention.

DETAILED DESCRIPTION OF THE PREFERRED EMBODIMENT

Briefly, according to the invention, there is provided a process for molding parts or articles using a low-pressure, reaction-injection molding (RIM) technique. The method uses a flexible mold made from an elastomeric material. An elastomer is a polymeric material, such as a synthetic rubber or plastic, which at room temperature can be stretched under a low stress to at least twice its original length. Upon immediate release of this stress, the elastomer will return with force to its approximate original length. Examples of well-known elastomers are materials such as natural or synthetic rubber, silicone rubber, urethane rubbers, thermoplastic elastomers (TPE), polyvinyl-chloride, and polysulfide molding compounds. In the preferred embodiment, the elastomer used for the mold is inert, self-supporting, and remains substantially free from interaction with the material to be molded. The use of an elastomeric material allows production of complex parts that have backdrafts or undercuts, without necessitating the need for expensive and costly mechanisms in the mold, such as slides and pulls. The molding tool has features that enhance its ability to withstand the pressurized molding conditions required to produce accurate representations of the desired part. A rigid mold box surrounds all sides of the mold in order to contain the elastomeric mold and prevent distortion of the mold during filling. The sidewalls of the mold box are slanted away from vertical, that is to say that they are at an angle of greater than 90° with respect to the bottom of the mold box in order to aid in removing of the elastomeric mold from the mold box. Other features include mold stiffeners provided to significantly reduce the deformation of the flexible mold walls during filling of the mold cavity. Stiffeners are strategically located near those portions of the cavity that correspond to, for example, thin-walled portions of the molded article. This provides the unique benefit that the elastomer is held in rigid alignment during the molding operation, but after removal from the stiff mold box it can be flexed, thereby facilitating withdrawal of the molded article from the mold. These allow the tool to be used with a pressurized RIM processes, thereby significantly increasing the productivity of the tool. The RIM process provides rapid cycle time and production of a larger number of parts in a given time. In addition, materials used for RIM typically have improved mechanical properties as compared with those materials used for conventional gravity cast systems. Other features provided in the apparatus include specific gating for the material to be injected into the cavity, venting of gases from the mold cavity, and use of removable stiffeners to block or restrict motion in localized areas. These provide the ability to mold thin cross sections and easy removal of the part.

Referring now to FIG. 1, a process in accordance with the present invention is generally indicated. In the preferred embodiment, the tool is comprised of two halves, but in other embodiments of the invention, one half of the mold may simply be a planar cover that abuts the other half of the tool. Each half of the tool contains a flexible elastomeric mold with a cavity that corresponds to the shape of the desired article to be molded. In those cases where the tool consists of upper and lower halves of the mold, the cavity represents a portion typically about one-half of the article to be molded. The remainder of the article to be molded is represented by a cavity in the upper half of the elastomeric mold. The cavities are typically formed by casting a pourable elastomeric material about a portion of the original part. This technique of preparing flexible molds by casting a resin around a master is well known to those skilled in the art. Because the mold is formed from a flexible material, it can be easily bent or flexed in order to facilitate removal of the molded part from the cavity. This is most useful when the part contains undercuts that would make removal from the cavity difficult if not impossible were the mold not able to be flexed.

The flexible elastomeric mold is contained in a rigid mold box. The mold box typically resembles a five-sided box, but may, of course, take other shapes. It should now be apparent that it is important for the elastomeric mold to be very stiff during the molding process to facilitate dimensional accuracy, but it must also be flexible to permit easy removal of the part. The flexible elastomeric mold is disposed in the mold box in such a manner that the walls of the mold are in intimate contact with the walls of the mold box. The mold box serves to constrain the flexible elastomeric mold from distorting during the molding process.

Once the tool has been created, the two halves of the mold are joined together and the mold is closed (step 10), thereby creating a cavity that defines the shape of the article to be molded. A clamping means such as a latch, lock, clamp, or other type of connecting mechanism serves to rigidly affix one mold box half to the other mold box half. The clamping means holds the two boxes together so that the flexible mold does not deform or distort during the molding process. If the elastomeric mold is allowed to move, then the molded part will not be precisely formed. Those skilled in the art will appreciate that while elastomers are well known as being deformable, they are not compressible. By properly constraining the elastomeric mold, it will behave like a rigid material. This surprising twist allows a flexible mold to be used to make high precision parts with a pressurized molding process, heretofore unattainable.

A gate is typically located near a central portion of the cavity in order to provide uniform and rapid filling. Vent holes located near the perimeter or other high points of the part allow for removal or escape of gases that may be entrapped in the cavity, either prior to or during the molding process. In order to further facilitate the removal of gases from the molding cavity, the entire tool is placed in a vacuum chamber, and a vacuum is drawn upon the chamber, thereby likewise evacuating the cavity, the gate, and the vents (step 20). A material is then injected into the cavity through the gate (step 30), filling the cavity much more rapidly and consistently than would otherwise be encountered under normal atmospheric conditions. The use of a vacuum assist further aids in the definition of the thin sidewalls and highly precise parts because pressure created by escaping air does not distort the flexible elastomeric mold.

The preferred method of molding the article is to use a synthetic resin reacting a polyol or a polyamine with a polyisocyanate in the presence of a catalyst such as a tertiary amine or metal catalyst to provide a cross-linked urethane resin. The resulting reaction product is the well-known group of polyurethanes. This technique of simultaneously mixing and injecting the unreacted components is known as reaction injection molding (RIM). Reinforcing materials such as glass, metal, or plastic fibers or particles may also be mixed with the reactants. Examples of materials typically used in the RIM process may be found in U.S. Pat. No. 5,239,041. It is desirable when using RIM to have the components react together at a rate appropriate to the rate of filling of the mold. That is, the components should preferably not react together until the entire mold is filled with the mixture. If the reaction occurs prematurely, the RIM materials will set up or gel in part of the mold and thus prevent the remaining liquid materials from filling the mold, resulting in an incomplete part or a "short shot". However it is equally undesirable to have long flow times where the components stay in a mixed but unreacted state long after the mold has filled, in order to reduce production costs. Since the RIM mixture is shot into the cavity under pressure (typically 30–50 PSI), it is important to closely control the amount of material that is injected. Injecting too little is obviously undesirable, since it is manifested as an incomplete part or a "short shot". Similarly, too much material will over pressurize the flexible mold, and may cause separation of the two mold halves, resulting in mold "flash". The amount of material injected is directly related to the volume of the cavity and associated gates and runners. This amount is predetermined before injection, and carefully controlled.

The chamber is then vented to ambient pressure, and opened to remove the mold box (step 40). The mold box is then opened, and the mold is removed from the rigid mold box (step 50). The elastomeric mold is then flexed in a manner so as to release the part from the mold (step 60). Depending on the severity of the undercuts in the part, the amount of flexing can vary from slight to substantial.

In summary, the process of the instant invention provides a method of making dimensionally accurate, precise parts. Many parts may be made from the tool because a high durometer silicone rubber can be used. Small parts having undercuts and backdraft angles can also be created because once the flexible mold is removed from the mold box it can be easily distended, facilitating removal of the molded part. Appropriate gating and venting further provides rapid filling of the RIM material into the tool. The use of a vacuum assist by drawing vacuum on the vent lines or enclosing the entire tool in a vacuum chamber further reduces distortion of the mold and facilitates rapid cycle time. The instant invention provides an alternative to costly and complex metal or hard plastic tools used in the conventional art to mode parts with undercuts. The invention yields low cost, precision plastic parts in a rapid cycle time. In addition, the use of RIM technology allows a wider variety of materials to be used, which more accurately duplicates the final product. Thus a significant improvement in the art has been realized by the creation of a low-cost, high-quality prototype molded part.

While the preferred embodiments of the invention have been illustrated and described, it will be clear that the invention is not so limited. For example, the step of drawing a vacuum on the mold cavity can be performed by appropriately applying a vacuum to only the cavity, via the vent holes, thereby eliminating the need to place the entire mold box and mold into a vacuum chamber. Similarly, when venting the cavity after the injection step, the mold box would not necessarily have to be removed from the vacuum chamber, but could be opened and the elastomeric mold removed while in the chamber. Numerous other modifications, changes, variations, substitutions and equivalents will occur to those skilled in the art without departing from the spirit and scope of the present invention as defined by the appended claims.

What is claimed is:

1. A method of molding dimensionally accurate plastic articles using a low-pressure injection molding process, comprising the following steps in the order named:

providing an elastomeric mold having a cavity representative of the plastic article, the mold removably disposed in a rigid mold box such that the mold is substantially encased on all sides to prevent deformation of the cavity during the low-pressure injection molding process;

placing the mold box and the encased elastomeric mold in a chamber;

drawing at least a partial vacuum on the chamber;

injecting under pressure a predetermined amount of resin material into the elastomeric mold so that the material fills the cavity to form the plastic article;

venting the chamber to return the chamber to ambient pressure;

removing the elastomeric mold from the rigid mold box; and flexing the elastomeric mold in order to remove the plastic article from the elastomeric mold.

2. The method as described in claim 1, wherein the predetermined amount of material is an amount sufficient to fill the cavity but not sufficient to distort the cavity.

3. The method as described in claim 1, wherein the step of injecting comprises injecting a mixture containing at least two materials that react to form a polymer.

4. The method as described in claim 1, wherein the step of injecting comprises reaction injection molding at 30–50 psi.

5. The method as described in claim 1, further comprising the step of removing the mold box and the encased mold from the chamber, after the step of venting the chamber.

6. A method of molding dimensionally accurate plastic articles using a reaction injection molding process, comprising the following steps in the order named:

providing a two-piece silicone rubber mold having a cavity representative of the plastic article, the mold disposed in a two-part rigid mold box such that the mold is substantially encased on all sides to prevent deformation of the cavity during the low-pressure injection molding process;

placing the rigid mold box and the encased two-piece silicone rubber mold in a vacuum chamber;

drawing at least a partial vacuum on the chamber, thereby evacuating the cavity;

substantially simultaneously mixing and injecting under pressure a predetermined amount of a mixture containing at least two reactants into the two-piece silicone rubber mold to form the plastic article, under conditions sufficient to fill the cavity and to prevent deformation of the cavity during the low-pressure injection molding process;

venting the chamber to return the chamber to ambient pressure;

removing the two-piece silicone rubber mold from the rigid mold box; and flexing the two-piece silicone rubber mold in order to remove the plastic article from the mold.

7. The method as described in claim 6, wherein the mixture reacts to form a polyurethane plastic.

8. The method as described in claim 6 wherein the step of substantially simultaneously mixing and injecting comprises reaction injection molding.

9. The method as described in claim 6, wherein the step of reaction injection molding is performed at 30–50 psi.

10. The method as described in claim 6, further comprising the step of removing the rigid mold box and the encased two-piece silicone rubber mold from the chamber, after the step of venting the chamber.

11. A method of molding dimensionally accurate plastic articles using a reaction injection molding process, comprising the following steps in the order named:

providing a two-piece silicone rubber mold having a cavity representative of the plastic article, the mold disposed in a two-part rigid mold box such that the mold is substantially encased on all sides to prevent deformation of the cavity during the low-pressure injection molding process;

drawing at least a partial vacuum on the cavity to evacuate it;

substantially simultaneously mixing and injecting under pressure a predetermined amount of a mixture containing at least two reactants into the two-piece silicone rubber mold to form the plastic article, under conditions sufficient to fill the cavity and to prevent deformation of the cavity during the low-pressure injection molding process;

removing the two-piece silicone rubber mold from the rigid mold box; and flexing the two-piece silicone rubber mold in order to remove the plastic article from the mold.

* * * * *